(12) United States Patent
Duke

(10) Patent No.: US 11,360,469 B2
(45) Date of Patent: Jun. 14, 2022

(54) SYSTEMS AND METHODS FOR MONITORING AND DETERMINING HEALTH OF A COMPONENT

(71) Applicant: Simmonds Precision Products, Inc., Vergennes, VT (US)

(72) Inventor: Alan M. Duke, Ferrisburg, VT (US)

(73) Assignee: Simmonds Precision Products, Inc., Vergennes, VT (US)

(*) Notice: Subject to any disclaimer, the term of this patent is extended or adjusted under 35 U.S.C. 154(b) by 0 days.

(21) Appl. No.: 16/241,416

(22) Filed: Jan. 7, 2019

(65) Prior Publication Data

US 2020/0218248 A1 Jul. 9, 2020

(51) Int. Cl.
*G05B 23/02* (2006.01)

(52) U.S. Cl.
CPC .............................. *G05B 23/0283* (2013.01)

(58) Field of Classification Search
CPC ........ G01H 5/00; G01H 11/08; G10K 11/004; G01M 5/0033; G01M 5/0066; G01N 29/069; G01N 29/2475; G01N 29/262; G01N 29/4418; G01N 29/46
See application file for complete search history.

(56) References Cited

U.S. PATENT DOCUMENTS

| | | | |
|---|---|---|---|
| 6,006,163 A * | 12/1999 | Lichtenwalner | G01H 5/00 702/34 |
| 6,389,887 B1 | 5/2002 | Dusserre-Telmon et al. | |
| 9,804,054 B2 | 10/2017 | Vinod et al. | |
| 9,983,576 B2 | 5/2018 | Czerniak et al. | |
| 2005/0033200 A1* | 2/2005 | Soehren | A61B 5/1123 600/595 |
| 2007/0050104 A1 | 3/2007 | Wallace et al. | |
| 2012/0188997 A1* | 7/2012 | Zakrzewski | H04J 3/0667 370/350 |

(Continued)

FOREIGN PATENT DOCUMENTS

EP 2998894 A1 3/2016

OTHER PUBLICATIONS

Extended European Search Report dated May 26, 2020, issued during the prosecution of European Patent Application No. EP 19214619.9.

*Primary Examiner* — Lee E Rodak
*Assistant Examiner* — Brent J Andrews
(74) *Attorney, Agent, or Firm* — Locke Lord LLP; Scott D. Wofsy; Alicia J. Carroll

(57) ABSTRACT

A health monitoring system includes at least one sensor. A health monitoring unit (HMU) is operatively connected to the at least one sensor to receive data therefrom and to generate at least one status indicator (SI) based on the data from the at least one sensor. A computing device is operatively connected to the HMU to receive data therefrom and is configured to generate a health notification when a quantity of the SI that are greater than or equal to a pre-determined SI threshold exceed a pre-determined peak count threshold. A method for monitoring and determining the health of a component includes collecting data during a sample cycle from at least one sensor to generate a numerical SI for a given component with a computing device. The method includes identifying if the numerical SI qualifies as a peak SI, which is greater or equal to a pre-determined SI threshold.

18 Claims, 4 Drawing Sheets

(56) References Cited

U.S. PATENT DOCUMENTS

2016/0349744 A1* 12/2016 Czerniak ............... G01M 15/14
2017/0124785 A1   5/2017 Rozak et al.
2017/0199164 A1* 7/2017 Shirata .................. G01N 29/14
2018/0017961 A1   1/2018 Bense et al.

\* cited by examiner

SYSTEMS AND METHODS FOR
MONITORING AND DETERMINING
HEALTH OF A COMPONENT

BACKGROUND

1. Field

The present disclosure relates health usage and management systems, and more particularly to systems and methods for monitoring and determining the health or condition of a component or system.

2. Description of Related Art

Diagnosing or estimating the health state of a component is often performed by extracting a feature from a signal then monitoring the trend of this feature to see if it exceeds a threshold. The feature may be a single feature such as a condition indicator (CI) or a composite feature that is derived from multiple features such as a Health Indicator (HI). The signals and/or features can be quite noisy due to a variety of influences. It is common to filter or smooth the feature trend before comparing it to the threshold.

For many component types, the raw and smoothed features generally trend upwards until failure is imminent. However, not all component types follow this trend, making it difficult to determine a proper threshold and/or analysis that should be applied. Setting thresholds too low can lead to too-early detections and setting thresholds too high can lead to missed detections.

The conventional techniques have been considered satisfactory for their intended purpose. However, there is an ever present need for improved health usage and management systems and methods. This disclosure provides a solution for this need.

SUMMARY

A health monitoring system includes at least one sensor. A health monitoring unit (HMU) is operatively connected to the at least one sensor to receive data therefrom and to generate at least one status indicator (SI) based on the data from the at least one sensor. A computing device is operatively connected to the HMU to receive data therefrom. The computing device is configured to generate a health notification when a quantity of the SI that are greater than or equal to a pre-determined SI threshold exceed a pre-determined peak count threshold.

In accordance with some embodiments, the at least one sensor is an accelerometer. The system can include a fan case. The at least one sensor can be mechanically coupled to the fan case. A graphical user interface can be operatively connected to the computing device. The computing device can be configured and adapted to display a health notification on a graphical user interface.

In accordance with another aspect, a method for monitoring and determining the health of a component includes collecting data during a sample cycle from at least one sensor to generate a numerical status indicator (SI) for a given component with a computing device. The method includes identifying if the numerical SI qualifies as a peak SI. The peak SI is greater than or equal to a pre-determined status indicator threshold. The at last one status indicator can include at least one of a condition indicator or a health indicator.

In accordance with some embodiments, the pre-determined SI threshold is equal to a sum of a mean value of a historical series of numerical status indicators and a standard deviation of the historical series multiplied by a configurable factor. Collecting data from the at least one sensor can be continuously performed while the component is in use. The method can include adding the numerical status indicator to a historical series of numerical status indicators to generate a new historical series of numerical status indicators. The method can include generating a health notification and/or performing a maintenance action when the number of peak SIs in the new historical series of numerical SIs exceeds a pre-determined peak count threshold. The method can include determining a standard deviation for the new historical series of numerical status indicators. The standard deviation for the new historical series of numerical status indicators can be recalculated in real-time each time another numerical status indicator is added. The method can include determining a mean for the new historical series of numerical status indicators. The mean for the new historical series of numerical status indicators can be recalculated in real-time each time another numerical status indicator is added.

The method can include displaying the health notification on a graphical user interface. The method can include storing the numerical status indicator with a historical series of numerical status indicators to generate a new historical series. The method can include resetting the historical series of numerical status indicators after a repair action has been taken such that a quantity of numerical status indicators in the historical series is set to zero. The numerical status indicator can be at least one of a condition indicator or a health indicator.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE
PREFERRED EMBODIMENTS

Figure 1:
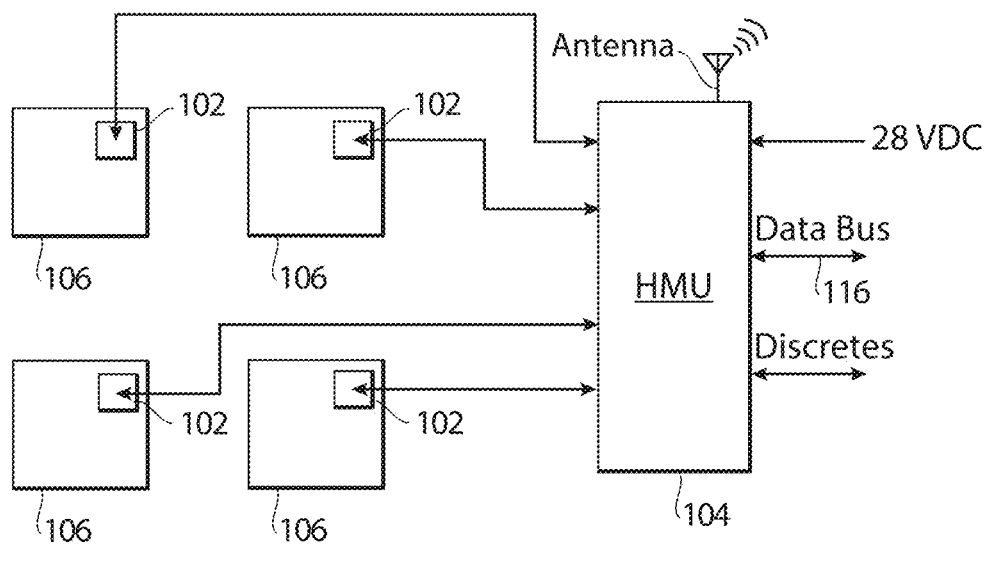
FIG. 1 is a block diagram schematically depicting an embodiment of a health monitoring system constructed in accordance with the present disclosure, showing a sensor operatively connected to a HMU to provide data thereto.
Figure 1:
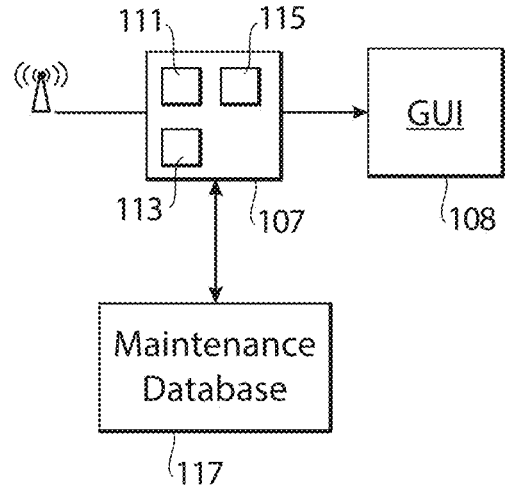

Reference will now be made to the drawings wherein like reference numerals identify similar structural features or aspects of the subject disclosure. For purposes of explanation and illustration, and not limitation, an exemplary embodiment of a system for monitoring and determining the health of a mechanical component in accordance with the disclosure is shown in FIG. 1 and is designated generally by reference character 100. Other embodiments of systems and methods for monitoring and determining the health of a mechanical component in accordance with the disclosure, or aspects thereof, are provided in FIGS. 2-4, as will be described. The systems and methods described herein can be used to improve the accuracy of estimating the health of a mechanical component by counting the number of degradation instances that exceed a given threshold (e.g. counting "peaks") as opposed to determining when an overall degradation trend exceeds a given threshold. This results in the system more accurately displaying overall health on a graphical user interface (GUI) and providing more appropriately timed maintenance action notifications to a user.

Figure 3:
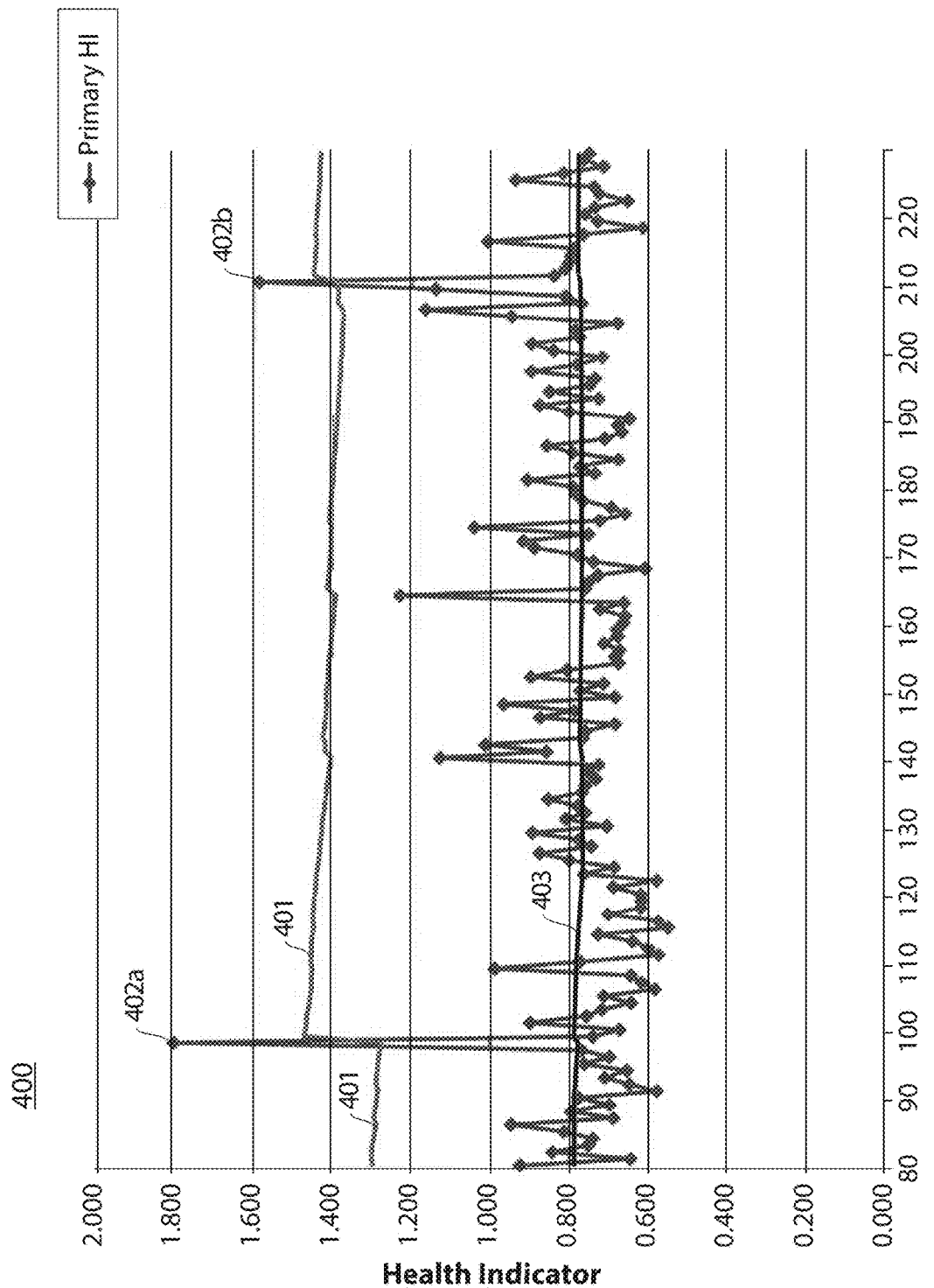
FIG. 3 is a plot schematically depicting an embodiment of a comparison of health indicators to a dynamic threshold for monitoring and determining the health of a mechanical component in accordance with the present disclosure.

As shown in FIG. 1, a health monitoring system 100 includes at least one sensor 102, e.g. an accelerometer. In accordance with the embodiment of FIG. 1, each accelerometer 102 is mechanically coupled to a respective fan case 106. It is also contemplated that each fan case could have more than one sensor associated therewith. Embodiments of system 100 can be implemented on a fan assembly (which includes the fan case 106) to assess the health of bearings inside a fan assembly. In the particular application of bearings in fan assemblies, degradation may occur in spurts, followed by longer periods of little or no wear, meaning that the status indicator trend (in this embodiment, a health indicator trend) stays relatively constant, e.g. as shown in FIG. 3 by mean line 403. This makes it difficult to use a traditional degradation trend to determine health. As used in the present description and claims, "status indicator(s) (SI)" is/are used to describe a single feature derived from a signal (e.g. condition indicator(s) (CI)) and/or a composite feature that is derived from multiple features or signals (e.g. health indicator(s) (HI)).

In the embodiment of FIG. 1, a health monitoring unit (HMU) 104 is operatively connected to the sensors 102 to receive data therefrom and to generate condition indicators (CIs) based on the data from the sensors 102. A computing device 107 is operatively connected to the HMU 104 to receive data, e.g. the CIs, therefrom. The computing device 107 and the HMU can be coupled to one another via wireless or cellular link, e.g. where the HMU is on-aircraft and the computing device is on-ground. The HMU can also be operatively connected to other on-aircraft systems to send or receive other "discretes," such as data related to programing and or other aircraft characteristics, e.g. the "weight on wheels" (WOW). HMU can include a +28 VDC power input and at least one data bus 116. Data bus 116 can be a data input and/or output and can be operatively connected to one or more other aircraft systems. It is contemplated that HMU 104 includes a processor, memory, etc., similar to computing device 107, as described below.

With continued reference to FIG. 1, the computing device 107 is configured to generate one or more status indicator (e.g. a HI) and/or generate a health notification when a quantity of the HI samples that are greater than or equal to a pre-determined HI threshold exceed a pre-determined peak count threshold. This method is based on the assumption that a component can only withstand a certain number of these peaks/degradation bursts before becoming unserviceable. A single HI for an assembly or component can be generated by computing device 107 from multiple CIs. For purposes of determining whether the HI is a peak HI and/or for determining whether the quantity of peak HI has exceeded the pre-determined peak count threshold, computing device 107 is in communication with, or includes, a maintenance database 117. The system includes a GUI 108 that is operatively connected to the computing device 107. It is contemplated that the computing device 107 can include or be operatively connected to maintenance database 117 to send and/or receive data therefrom for historical tracking purposes, maintenance and investigation support, and threshold validation and improvement. It is also contemplated that a second computing device, similar to computing device 107, can be operatively connected to maintenance database 117 and GUI 108 and can be included to receive HI data from the database 117 and perform the peak counting and sending of the health notification to the GUI 108.

With continued reference to FIG. 1, the computing device 107 is configured and adapted to display the health notification on the GUI 108. The health notification generated by computing device 107 can be a binary indicator (e.g. Yes/No) versus the CI and HI, which are analog (rational numbers). The generated health notification can be displayed in the same binary fashion on the GUI or can be otherwise processed by another processor, or the like, such that displaying the health notification on the GUI includes an icon, or other display feature. The GUI is a customer interface that displays a condition of the fan and the HMU status at different levels, e.g. a fleet level, aircraft level, and fan level. Those skilled in the art will also readily appreciate that between computing device 107 and GUI 108, intermediate systems, processors, interfaces, or the like, can be included.

Figure 2:
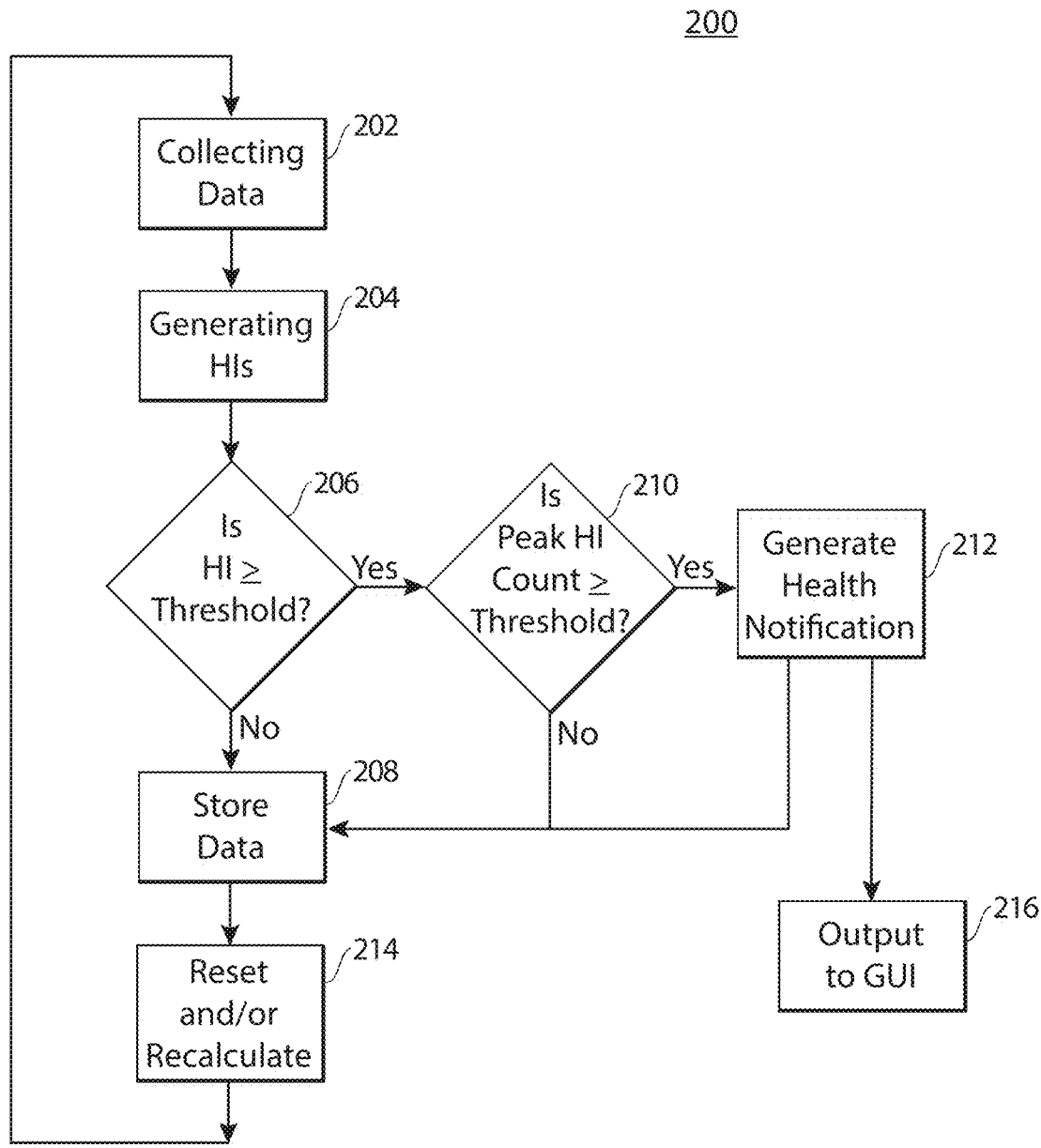
FIG. 2 is a flow chart schematically depicting an embodiment of a method for monitoring and determining the health of a mechanical component in accordance with the present disclosure.

As shown in FIG. 2, a method 200 for monitoring and determining the health of a mechanical component includes collecting data during a sample cycle from at least one sensor, e.g. a sensor 102, as schematically indicated by box 202. Collecting data from at least one sensor is continuously performed while the sensor is in an ON state and the component(s) being monitored is/are operating. The sensor can be ON all the time while the mechanical component is in use, or can be periodically ON for a given duration separated by a given time interval, e.g. the sensor can be ON for one flight hour every eight flight hours, or the like. The frequency of monitoring may influence how the various thresholds are set, e.g. if continuous monitoring over all flight hours is performed, the thresholds may be set higher. From the data collected, a series of numerical status indicators, e.g. heath indicators (HIs), are generated, as schematically indicated by box 204, with a computing device, e.g. computing device 107. In the current embodiment, the HMU generates one or more CIs from processed acceleration signals received from one or more sensor. Computer 107 computes one or more HIs from the CIs (as described above). It is contemplated that, in some embodiments, the HMU may compute both the CIs and HIs.

With continued reference to FIG. 2, the method 200 includes identifying if the most recent numerical HI qualifies as a peak HI, if any, as schematically indicated by box 206. Determining whether a given HI qualifies as a peak HI includes determining whether the most recent numerical HI is greater than or equal to a pre-determined status indicator threshold (e.g. a HI threshold). The pre-determined HI threshold is equal to a sum of a mean value of a historical series of numerical status indicators (e.g. HIs) and a configurable factor ($\alpha$) times a standard deviation (SD) of the historical series of numerical HIs. This is mathematically represented as follows:

$$T_{HI} = \text{mean} + \alpha(SD)$$

If the HI is greater or equal to the $T_{HI}$, then the health indicator is considered a peak HI. The predetermined threshold $T_{HI}$ does not take into account the present HI value to which it is being compared. This comparison can be performed by computing device 107, which can reference a maintenance database 117 for predetermined threshold $T_{HI}$ value. Once the comparison is complete, however, the method includes storing the present numerical HI and adding the numerical HI to the historical series of numerical HI stored, e.g. in the maintenance database, for the given component to generate a new historical series of numerical status indicators (e.g. HIs), as schematically indicated by box 208. This new historical series will be used for the predetermined threshold $T_{HI}$ for future comparisons. The method 200 includes determining the standard deviation and the mean for the new historical series of numerical HI after each numerical HI is added, as schematically indicated by box 214. For example, data may be taken over months or longer before a repair or maintenance action re-sets the full data cycle. As such, data from prior sample cycles is taken into account when determining the thresholds and peak count for a present cycle. The algorithm uses all the HI values available since monitoring was started for a given component to compute the sample mean and standard deviation.

As shown in FIG. 2, the method 200 includes determining whether the number of peak HI exceeds a pre-determined peak count threshold, as schematically indicated by box 210. The method 200 includes generating a health notification when the number of peak HI exceeds a pre-determined peak count threshold, as schematically indicated by box 212. The predetermined peak count threshold can be variable depending on the application and monitoring timing. The method 200 includes displaying the health notification on a graphical user interface and/or performing a maintenance action, as schematically indicated by box 216. The method 200 includes resetting the historical series of numerical HI after a repair action has been taken such that a quantity of numerical HIs in the historical series is set to zero, as schematically indicated by box 214. Those skilled in the art will readily appreciate that the reset is for the data used to generate the HI threshold and the peak counting, but that the previously collected data is still stored, e.g. within a maintenance database as described above.

With reference now to FIG. 3, a plot 400 of a segment of a series of HI is shown. A top threshold line 401 schematically indicates $T_{HI}$ and how $T_{HI}$ varies as the samples are accumulated. In other words, $T_{HI}$ is a dynamic threshold. It also shows two peaks 402a, 402b (e.g. those samples with HI values that exceed $T_{HI}$). A line 403 that schematically indicates a mean of past HI is fairly constant (but still varies) in this time period. The peaks cause a noticeable change to the $T_{HI}$. As additional "normal" points are added that are lower than the prior peak the standard deviation decreases and therefore $T_{HI}$ drops. The factor $\alpha$ by which the SD is multiplied can vary depending on the application and the level of conservatism desired in a given application, e.g. it could range from 4 to 5. Test or field data on components monitored to failure may be necessary to apply this technique effectively to other types of components.

Figure 4:
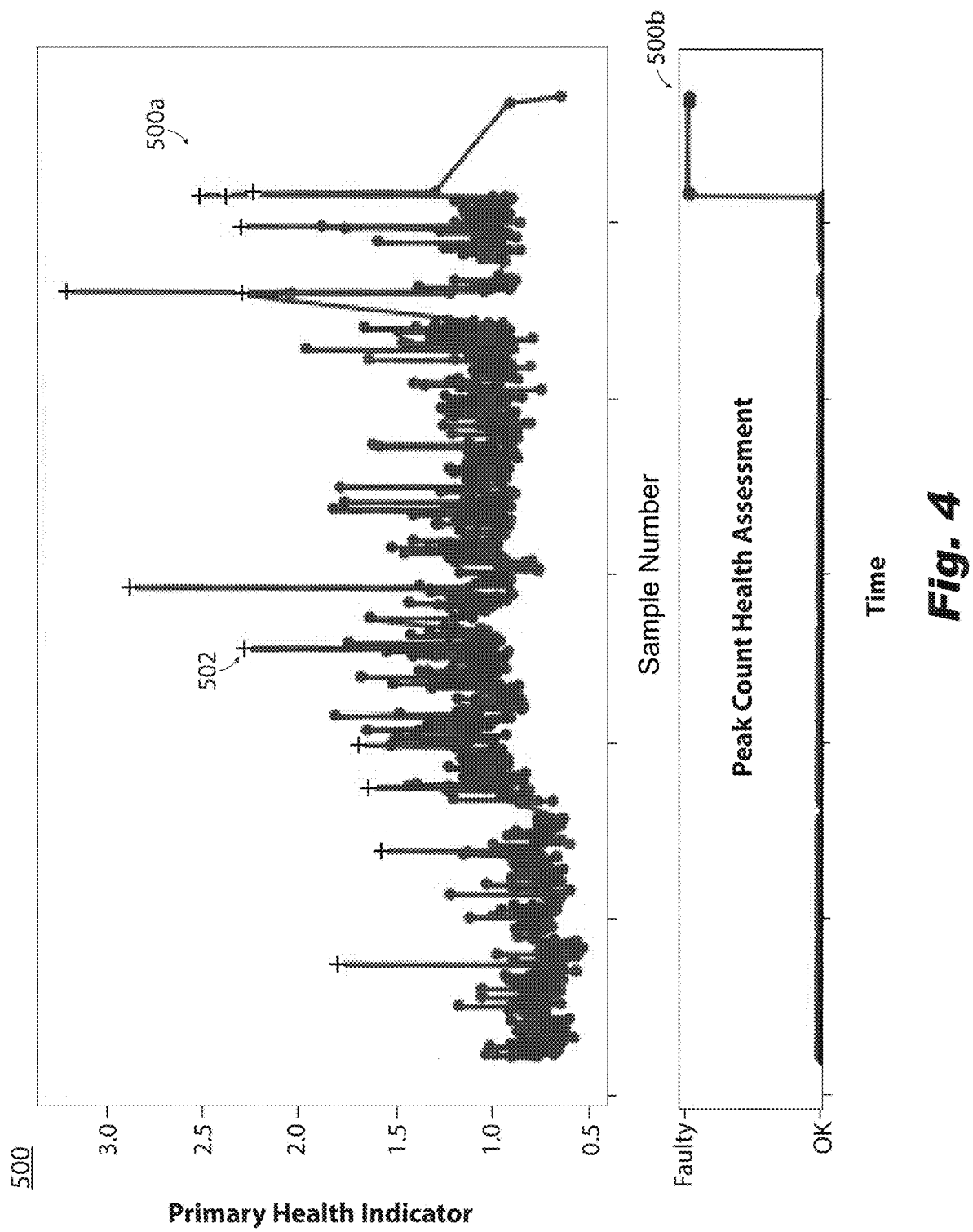
FIG. 4 is a plot schematically depicting an embodiment of a comparison of the quantity of the peak health indicators to a pre-determined peak count threshold in accordance with the present disclosure.

With reference now to FIG. 4, another embodiment of a plot 500 of a series of HI is shown. Plot 500 shows more data points than that of plot 400. The top half 500a shows the HI collected over time. The points with cross-shaped markers 502 are counted towards the allowable peak total. Due to the dynamic threshold, described above, some relatively high HI data points may not be included in the peak total due to the threshold being raised from prior past high HI data points. The lower part 500b of the plot shows the peak count health assessment vs. time. Time can be denoted in the form of dates, flight hours, etc. Once the peak count is considered to meet or exceed a given peak count threshold, it is considered faulty and repair, replacement, or other maintenance action will be recommended, as indicated by the step upwards on the right hand side of the plot.

With reference again to FIG. 1, computing device 107 is shown in the form of a general-purpose computing device. Computing device 107 includes a processing device 111, memory 113, an input/output (I/O) interface 115 that can communicate with an external component, e.g. a GUI 108, or maintenance database, and optionally an internal component. Moreover, computing device 107 can include the maintenance database, described above, or it can communicate with the maintenance database if it is external to the computing device 107. The processing device 111 can be, for example, a programmable logic device (PLD), microprocessor, digital signal processor (DSP), a microcontroller, a field programmable gate array (FPGA), an application specific integrated circuit (ASIC), or other discrete or integrated logic circuitry having similar processing capabilities.

The processing device 111 and the memory 113 can be included in components provided in the FPGA, ASIC, microcontroller, or microprocessor, for example. Memory 113 can include, for example, volatile and non-volatile memory for storing data temporarily or long term, and for storing programmable instructions executable by the processing device 111. HMU can also readily include a processing device and memory, similar to that processing device 111 and memory 113, described above. The I/O I/F 115 can communicatively couple to a power/data bus. In addition, I/O I/F 115 can include an interface to couple to one or more external components for example, an external sensing element, a keyboard, a pointing device, a display, another computing device, and/or a local or wide area network, such as the Internet, e.g., via a connector, near frequency communication, and wired or wireless communication. It is contemplated that HMU 104 includes components similar to computing device 107.

The methods and systems of the present disclosure, as described above and shown in the drawings, provide improved accuracy in estimating the health of mechanical components over previous methods that assumed that degradation health indicators would constantly trend upwards. This results in reduced component waste, inspection time and the like due to reduced premature faulty indicators. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A health monitoring system comprising:
   at least one sensor;
   a HMU operatively connected to the at least one sensor to receive data therefrom and to generate at least one status indicator based on the data from the at least one sensor; and
   a computing device operatively connected to the HMU to receive data therefrom,
   wherein the computing device is configured and adapted to:

compare each of the at least one status indicator to a pre-determined status indicator threshold to qualify the at least one status indicator as a peak status indicator if the at least one status indicator is above the pre-determined status indicator threshold;

count the peak status indicators to determine a quantity of peak status indicators, compare the quantity of peak status indicators to a pre-determined peak count threshold to determine if the quantity the peak status indicators exceeds the pre-determined peak count threshold, and generate a health notification if the quantity of the peak status indicators exceeds the pre-determined peak count threshold.

2. The system as recited in claim 1, wherein the at least one sensor is an accelerometer.

3. The system as recited in claim 1, further comprising a fan case, wherein the at least one sensor is mechanically coupled to the fan case.

4. The system as recited in claim 1, further comprising a graphical user interface operatively connected to the computing device, wherein the computing device is configured and adapted to display the health notification on the graphical user interface.

5. The system as recited in claim 1, wherein the at least one status indicator includes at least one of a condition indicator or a health indicator.

6. The system as recited in claim 1, wherein the pre-determined status indicator threshold is equal to a sum of a mean value of a historical series of numerical status indicators and a standard deviation of the historical series multiplied by a configurable factor.

7. A method for monitoring and determining a health of a component:

collecting data during a sample cycle from at least one sensor to generate a numerical status indicator for a given component with a computing device;

comparing the numerical status indicator to a pre-determined status indicator threshold to determine if the numerical status indicator qualifies as a peak status indicator (SI), wherein the peak status indicator is greater than or equal to a pre-determined status indicator threshold;

adding each numerical status indicator that qualifies as a peak status indicator to a historical series of numerical status indicators to generate a new historical series of numerical status indicators representative of a total number of a peak SIs;

determining a quantity of peak SIs in the new historical series of numerical status indicators;

comparing the quantity of peak SIs to a pre-determined peak count threshold; and at least one of (i) performing a maintenance action or (ii) generating a health notification when the quantity of peak SIs exceeds the pre-determined peak count threshold.

8. The method as recited in claim 7, wherein the pre-determined status indicator threshold is equal to a sum of a mean value of a historical series of numerical status indicators and a standard deviation of the historical series multiplied by a configurable factor.

9. The method as recited in claim 7, wherein collecting data from the at least one sensor is continuously performed while the component is in use.

10. The method as recited in claim 7, further comprising adding the numerical status indicator to a historical series of numerical status indicators to generate a new historical series of numerical status indicators.

11. The method as recited in claim 10, further comprising determining a standard deviation for the new historical series of numerical status indicators.

12. The method as recited in claim 11, wherein the standard deviation for the new historical series of numerical status indicators is recalculated in real-time each time another numerical status indicator is added.

13. The method as recited in claim 10, determining a mean for the new historical series of numerical status indicators.

14. The method as recited in claim 13, wherein the mean for the new historical series of numerical status indicators is recalculated in real-time each time another numerical status indicator is added.

15. The method as recited in claim 7, further comprising displaying the health notification on a graphical user interface.

16. The method as recited in claim 7, further comprising storing the numerical status indicator with a historical series of numerical status indicators to generate a new historical series.

17. The method as recited in claim 16, further comprising resetting the historical series of numerical status indicators after a repair action has been taken such that a quantity of numerical status indicators in the historical series is set to zero.

18. The method as recited in claim 7, wherein the numerical status indicator is at least one of a condition indicator or a health indicator.

\* \* \* \* \*